(12) United States Patent
Shimada et al.

(10) Patent No.: US 8,406,292 B2
(45) Date of Patent: Mar. 26, 2013

(54) MOVING PICTURE EDITING APPARATUS (75) Inventors: Satoshi Shimada, Kawasaki (JP); Akira Nakagawa, Kawasaki (JP); Akihiro Yamori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 499 days.

(21) Appl. No.: 12/461,204

(22) Filed: Aug. 4, 2009

(65) Prior Publication Data
US 2010/0061445 A1 Mar. 11, 2010

(30) Foreign Application Priority Data
Sep. 9, 2008 (JP) .................. 2008-230956

(51) Int. Cl.
H04N 7/26 (2006.01)
(52) U.S. Cl. ................ 375/240.02; 375/240.01; 386/241
(58) Field of Classification Search ........................ None
See application file for complete search history.

(56) References Cited

U.S. PATENT DOCUMENTS

| | | | | |
|---|---|---|---|---|
| 6,546,189 B1 * | 4/2003 | Koda | ............ | 386/241 |
| 6,683,911 B1 | 1/2004 | Inoue | | |
| 2004/0161033 A1 | 8/2004 | Notoya et al. | | |
| 2005/0190872 A1 * | 9/2005 | Seong et al. | ............ | 375/354 |

FOREIGN PATENT DOCUMENTS

| | | |
|---|---|---|
| JP | 2000-165802 | 6/2000 |
| JP | 2004-274732 | 9/2004 |
| JP | 2007-067842 | 3/2007 |

OTHER PUBLICATIONS

Japanese Office Action mailed May 15, 2012 for corresponding Japanese Application No. 2008-230956, with English-language translation.
Partial English-language translation of JP-2007-067842.

* cited by examiner

*Primary Examiner* — Christopher S Kelley
*Assistant Examiner* — Mohammed Jebari
(74) *Attorney, Agent, or Firm* — Fujitsu Patent Center (57) ABSTRACT

A moving picture editing apparatus includes a picture extracting unit that extracts pictures of a predetermined range including a picture subsequent to a coupling point from encoded data to be coupled; an adjustment-information generating unit that generates adjustment information for adjusting values of information to be continuous from/to inside to/from outside the predetermined range upon decoding, from among information included in headers of the pictures of the predetermined range extracted by the picture extracting unit; and a re-encoding unit that adds the adjustment information generated by the adjustment-information generating unit to the headers of the pictures of the predetermined range extracted by the picture extracting unit, and re-encodes the pictures of the predetermined range.

4 Claims, 9 Drawing Sheets

MOVING PICTURE EDITING APPARATUS

CROSS-REFERENCE TO RELATED APPLICATION(S)

This application is based upon and claims the benefit of priority of the prior Japanese Patent Application No. 2008-230956, filed on Sep. 9, 2008, the entire contents of which are incorporated herein by reference.

FIELD

The embodiments discussed herein are directed to a moving picture editing apparatus and a moving picture editing program.

BACKGROUND

Compression technologies for moving picture data such as H.264 and Moving Picture Experts Group 4 (MPEG-4) Part 10: Advanced Video Coding (AVC) have been standardized and attracting attention. Specifically, H.264 is recommended by International Telecommunication Union-Telecommunication Standardization Sector (ITU-T). MPEG-4 Part 10: AVC is a standard by International Organization for Standardization (ISO)/International Electrotechnical Commission (IEC) Joint Technical Committee 1 (JTC1). Because H.264 and MPEG-4 Part 10: AVC are technically the same, these will be generally referred to as H.264/AVC below.

H.264 /AVC permit a picture after an Intra (I) picture to refer to a picture before the I picture. Such a picture reference is controlled by using "frame_num" and "Picture Order Count (POC)" included in a header of each picture. Each "frame_num" corresponds to a counter that counts up referenced pictures, and each "POC" corresponds to a counter that counts up a display order of pictures, and values of "frame_num" and "POC" are each continuous.

Figure 11:
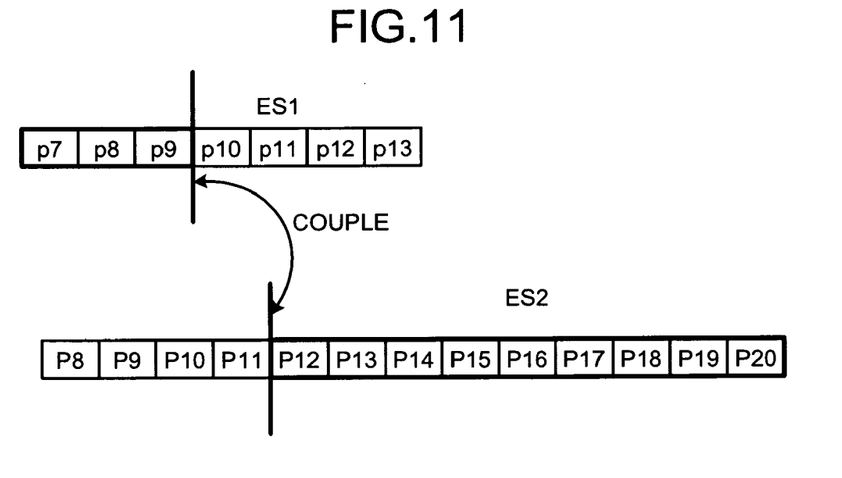
FIG. 11 is a diagram illustrating coupling of encoded data according to a conventional technology.
Figure 12:
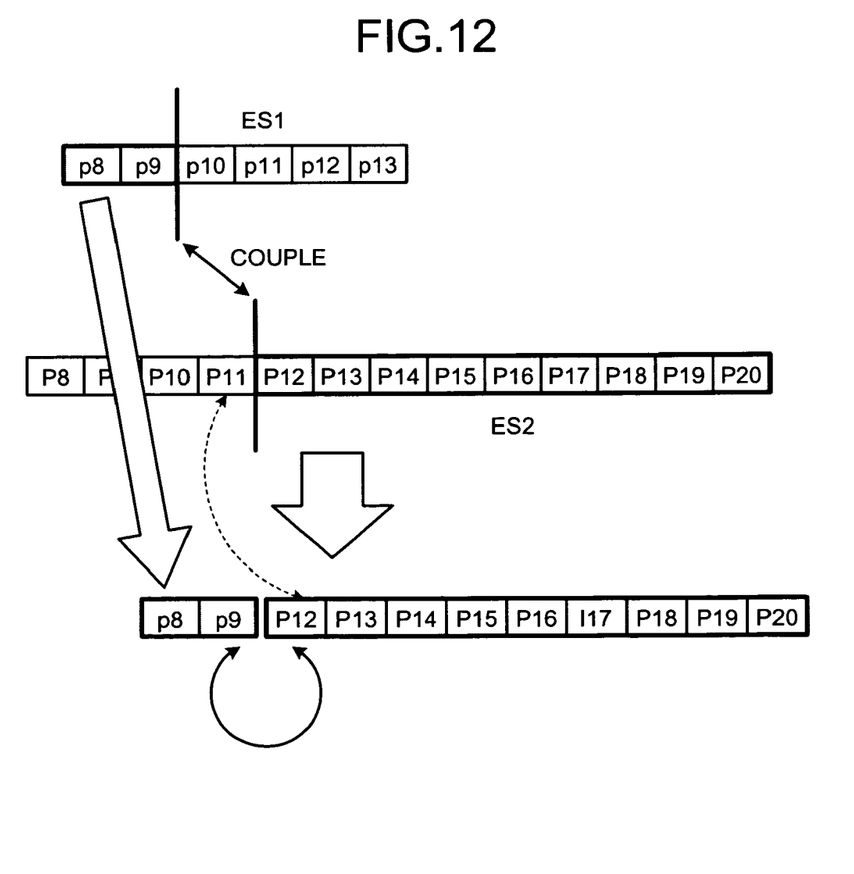
FIG. 12 is a diagram illustrating coupling of encoded data according to another conventional technology.

As illustrated in FIGS. 11 and 12, when a moving picture editing apparatus couples two pieces of moving picture data, for example, a picture P12 in an elementary stream ES2 is a predictive (P) picture, and thus the moving picture editing apparatus re-encodes the picture P12. That is, because a referenced picture in a forward direction is changed from a picture P11 to a picture p9, the moving picture editing apparatus re-encodes, for example, the picture P12 as an instantaneous decoding refresh (IDR) picture. Further, when the picture P12 is re-encoded as the IDR picture, values of "frame_num" and "POC" are reset to "0". Therefore, the moving picture editing apparatus sequentially re-encodes subsequent pictures, and changes values of "frame_num" and "POC" of all the subsequent pictures.

Figure 13:
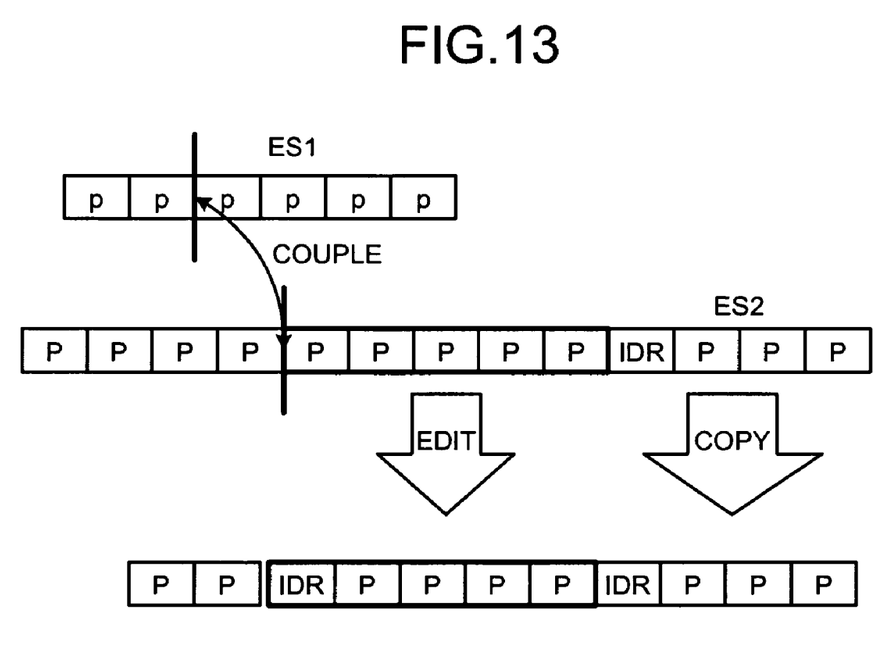
FIG. 13 is a diagram illustrating an example of using an IDR picture.

Conventionally, as illustrated in FIG. 13, there has been proposed a method in which a moving picture editing apparatus changes headers of subsequent pictures before a next IDR picture (see Japanese Laid-open Patent Publication No. 2007-67842). Further, for example, there has been proposed a method of encoding a flag indicating that values of "frame_num" and "POC" are discontinuous (see Japanese Laid-open Patent Publication No. 2004-274732). FIGS. 11 and 12 are diagrams illustrating conventional coupling of encoded data, and FIG. 13 is a diagram illustrating conventional coupling of encoded data using an IDR picture.

In the above-mentioned conventional technologies, the headers of many pictures need to be changed at the time of coupling two pieces of moving picture data. For example, as described above, the method of changing the headers of the subsequent pictures before the next IDR picture has been proposed. However, if there is no encoded IDR picture other than the leading picture, the values of "frame_num" and "POC" of all the subsequent pictures need to be changed ultimately. There has also been proposed the method of encoding the flag indicating that values of "frame_num" and "POC" are discontinuous. However, in this method, compatibility with existing decoders may be lost.

These problems are not limited to the examples in which the moving picture editing apparatus re-encodes the picture at the coupling point as the IDR picture. For example, even when the moving picture editing apparatus re-encodes the picture at the coupling point as an I picture, because the values of "frame_num" and "POC" are already set in each moving picture data before coupling, values of "frame_num" and "POC" do not become continuous after the coupling. Thus, the moving picture editing apparatus needs to change the values of "frame_num" and "POC" of all the subsequent pictures after the coupling point.

SUMMARY

According to an aspect of the invention, a moving picture editing apparatus includes a picture extracting unit that extracts pictures of a predetermined range including a picture subsequent to a coupling point from encoded data to be coupled; an adjustment-information generating unit that generates adjustment information for adjusting values of information to be continuous from/to inside to/from outside the predetermined range upon decoding, from among information included in headers of the pictures of the predetermined range extracted by the picture extracting unit; and a re-encoding unit that adds the adjustment information generated by the adjustment-information generating unit to the headers of the pictures of the predetermined range extracted by the picture extracting unit, and re-encodes the pictures of the predetermined range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Exemplary embodiments of a moving picture editing apparatus and a moving picture editing program according to the present invention will be explained below in detail with reference to the accompanying drawings. An outline of a moving picture editing apparatus according to a first embodiment of the present invention will be explained first, and a configuration, procedural steps, and effects of the moving picture editing apparatus according to the first embodiment will be explained next. Other embodiments of the present invention will be then explained.

[a] First Embodiment
[Outline of Moving Picture Editing Apparatus According to First Embodiment]

Figure 1:
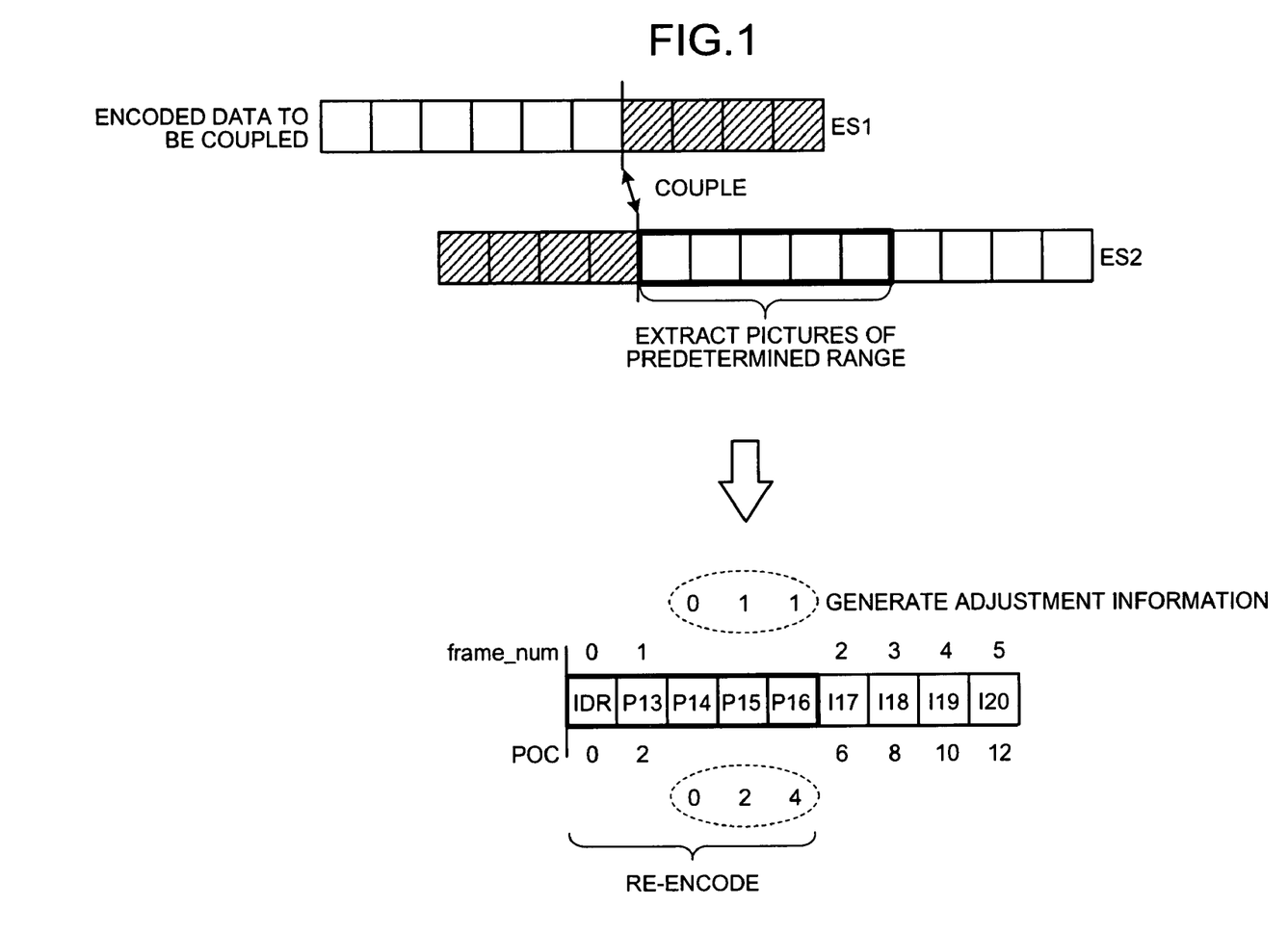
FIG. 1 is a diagram illustrating an outline of a moving picture editing apparatus according to a first embodiment of the present invention.

The outline of the moving picture editing apparatus according to the first embodiment is explained with reference to FIG. 1. FIG. 1 is a diagram illustrating the outline of the moving picture editing apparatus.

As illustrated in FIG. 1, the moving picture editing apparatus extracts, from encoded data to be coupled, pictures of a predetermined range including pictures subsequent to a coupling point. In the first embodiment, elementary streams ES1 and ES2 are the encoded data to be coupled.

Various methods may be used as a method of extracting the pictures of the predetermined range. The moving picture editing apparatus according to the first embodiment uses a method of determining in advance a minimum range for which values of "frame_num" and "POC" are adjustable and extracting pictures up to a picture immediately before an I picture so that the determined minimum range is included.

The moving picture editing apparatus then generates adjustment information for adjusting information to become continuous values upon decoding, from among information included in headers of the pictures in the extracted predetermined range, so that the information becomes continuous values from/to inside to/from outside of the predetermined range upon decoding. Specifically, as illustrated in FIG. 1, the moving picture editing apparatus generates the adjustment information for adjusting values of "frame_num" and "POC" included in the headers of the pictures so that these values become continuous from/to inside to/from outside of the predetermined range upon decoding.

As illustrated in FIG. 1, the moving picture editing apparatus adds the adjustment information to the headers of the pictures of the extracted predetermined range and performs re-encoding.

Accordingly, at the time of coupling the two pieces of moving picture data, the number of pictures, whose headers need to be changed, are reduced. Conventionally, when coupling two pieces of moving picture data, a moving picture editing apparatus needs to change values of "frame_num" and "POC" of all subsequent pictures so that the values of "frame_num" and "POC" become continuous upon decoding. The moving picture editing apparatus according to the first embodiment extracts the pictures of the predetermined range, makes adjustment within the predetermined range so that the change of values of "frame_num" and "POC" of the pictures is completed within the predetermined range, and re-encodes the pictures with the adjustment information. As a result, the number of pictures, for which the values of "frame_num" and "POC" are changed, are reduced.

[Configuration of Moving Picture Editing Apparatus According to First Embodiment]

Figure 2:
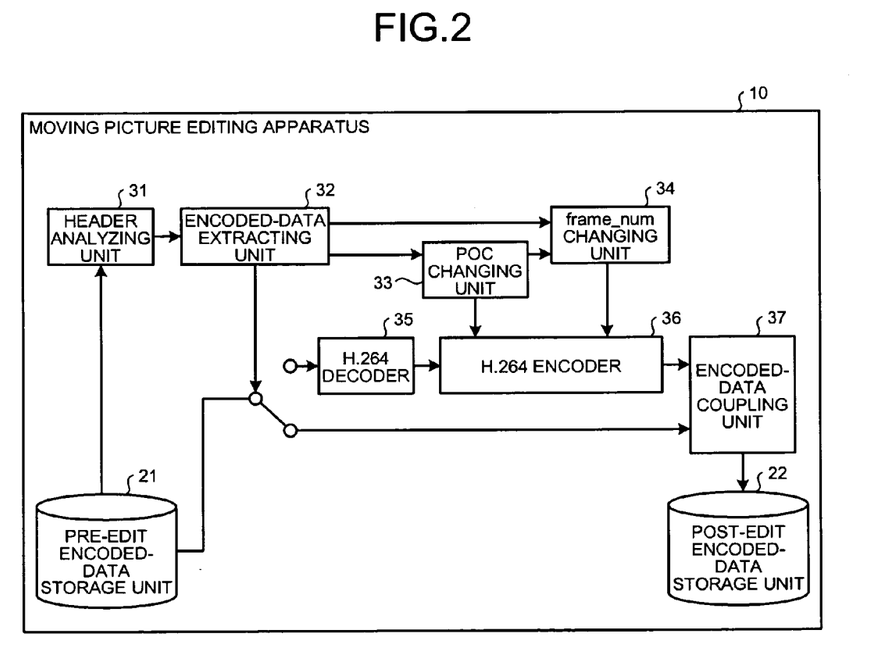
FIG. 2 is a block diagram of a configuration of the moving picture editing apparatus according to the first embodiment.
Figure 3:
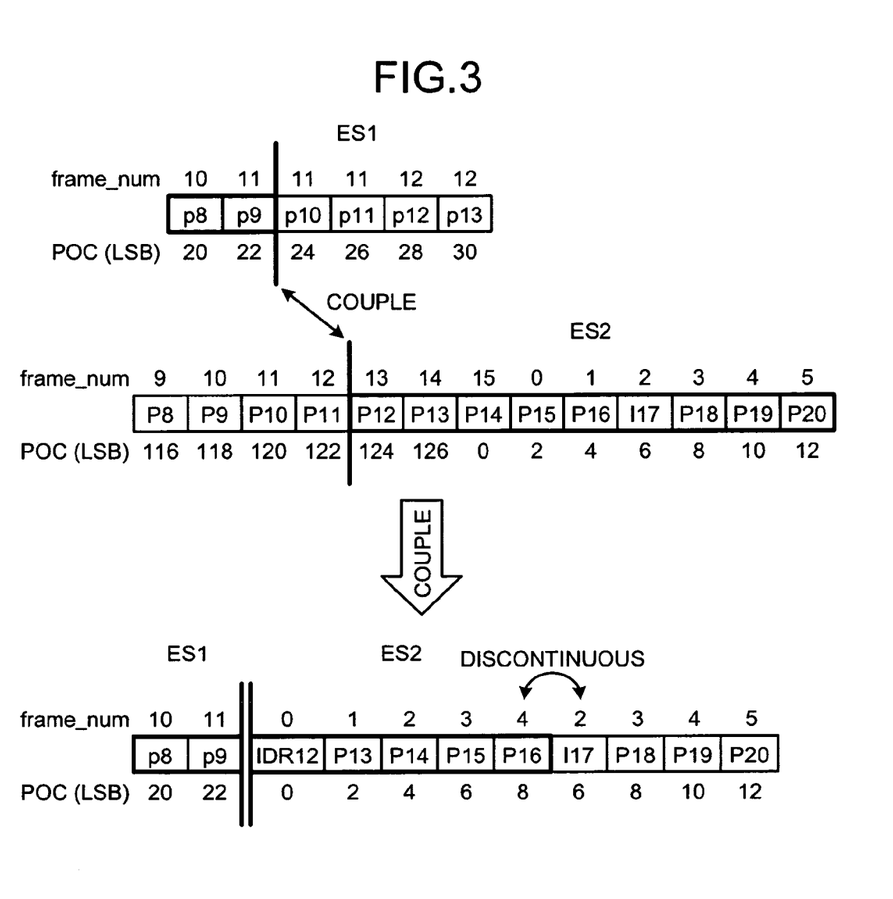
FIG. 3 is a diagram illustrating coupling of encoded data of a POC type 0.
Figure 4:
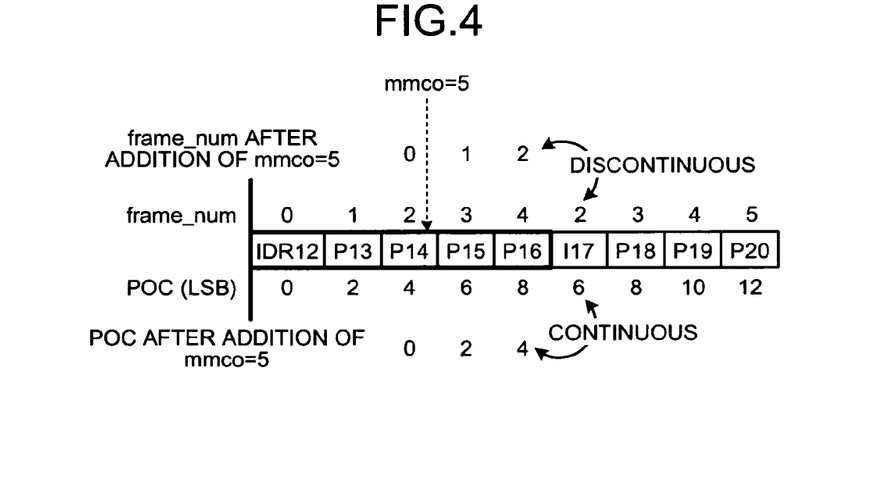
FIG. 4 is a diagram illustrating POC change in the first embodiment.
Figure 5:
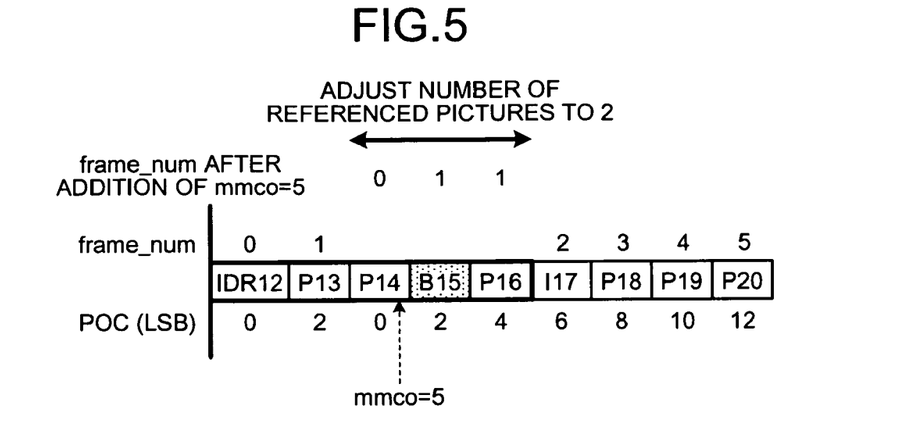
FIG. 5 is a diagram illustrating frame_num change in the first embodiment.

The configuration of the moving picture editing apparatus according to the first embodiment is explained with reference to FIGS. 2 to 5. FIG. 2 is a block diagram of the configuration of the moving picture editing apparatus. FIG. 3 is a diagram illustrating coupling of encoded data of a POC type 0, FIG. 4 is a diagram illustrating POC change in the first embodiment, and FIG. 5 is a diagram illustrating frame_num change in the first embodiment.

As shown in FIG. 2, a moving picture editing apparatus 10 according to the first embodiment includes, as a storage unit, a pre-edit encoded-data storage unit 21 and a post-edit encoded-data storage unit 22. The moving picture editing apparatus 10 further includes, as a controller, a header analyzing unit 31, an encoded-data extracting unit 32, a POC changing unit 33, a frame_num changing unit 34, an H.264 decoder 35, an H.264 encoder 36, and an encoded-data coupling unit 37.

The pre-edit encoded-data storage unit 21 stores therein encoded data yet to be edited. The pre-edit encoded-data storage unit 21 is connected to the header analyzing unit 31, the H.264 decoder 35, and the encoded-data coupling unit 37. The encoded data stored in the pre-edit encoded-data storage unit 21 is used in processing performed by the header analyzing unit 31, the H.264 decoder 35, and the encoded-data coupling unit 37.

For example, the encoded data is read by the header analyzing unit 31, and used in a header analyzing process. The encoded data is also read by the H.264 decoder 35 and the encoded-data coupling unit 37 and used in decoding and coupling processes. When the encoded data are read out by the H.264 decoder 35 and the encoded-data coupling unit 37, the encoded-data extracting unit 32 controls the reading.

For example, the pre-edit encoded-data storage unit 21 stores the elementary streams ES1 and ES2 illustrated in FIG. 3 as the encoded data. In FIG. 3, "frame_num" and "POC" included in the headers of the pictures are illustrated above and below the pictures for the purpose of explanation. Here, "frame_num" corresponds to a counter that counts up referenced pictures, and "POC" corresponds to a counter that counts up a display order of pictures. In FIG. 3, "POC (LSB)" refers to "pic_order_cnt_lsb" included in the header, which is a lower bit used in calculating "POC".

For example, "frame_num" in the elementary stream ES1 is counted up "10", "11", "11", "11", "12", and "12". Because a picture p8 is referenced by another picture, "frame_num" is counted up from "10" to "11" at a picture p9. Because pictures p9 and p10 are not referenced by other pictures, "frame_num" is not counted up from "11" at the picture p10 and a picture p11. Likewise, because the picture p11 is referenced by another pictures, "frame_num" is counted up from "11" to "12" at a picture p12. Because the picture p12 is not referenced by another picture, "frame_num" is not counted up from "12" at a picture p13. "POC" in the elementary stream ES1 is counted up "20", "22", "24", "26", "28", and "30".

As illustrated in FIG. 3, "frame_num" in the elementary stream ES2 has a largest value of "15", and "POS" in the elementary stream ES2 has a largest value of "126". Because numbers of bits provided for the counters of "frame_num" and "POC" are limited, when "frame_num" and "POC" are counted up to the largest values, the values of "frame_num" and "POC" return to an initial value "0", and counting up is restarted.

The post-edit encoded-data storage unit 22 stores the encoded data that have been edited. The post-edit encoded-data storage unit 22 is connected to the encoded-data coupling unit 37. The encoded data stored in the post-edit encoded-data storage unit 22 is stored by the encoded-data coupling unit 37.

The header analyzing unit 31 analyses the header of the encoded data yet to be edited. The header analyzing unit 31 is connected to the pre-edit encoded-data storage unit 21 and the encoded-data extracting unit 32. The header analyzing unit 31 reads the encoded data yet to be edited from the pre-edit encoded-data storage unit 21, decodes and analyses the headers of the pictures near the coupling point, and notifies a result of the analysis to the encoded-data extracting unit 32.

An analyzing process performed by the header analyzing unit 31 is explained with reference to FIG. 3. In the first embodiment, because the method of re-encoding a leading picture of the elementary stream ES2 as an IDR picture is used, the moving picture editing apparatus 10 does not need to change the pictures of the elementary stream ES1. Therefore, the header analyzing unit 31 decodes and analyzes the headers of the pictures from around a picture P12 up to around a picture P20 of the elementary stream ES2. Further, the header analyzing unit 31 according to the first embodiment uses the method of determining in advance the minimum range for which the values of "frame_num" and "POC" are adjustable to extract pictures up to the picture immediately before the I picture so that the determined minimum range is included.

The determination of the minimum range is closely related to a method of adjusting the values of "frame_num" and "POC". The adjustment method according to the first embodiment is briefly explained. In the first embodiment, a POC type 0 is considered. The moving picture editing apparatus 10 first adjusts the values of "POC" to be continuous, and adjusts the number of referenced pictures to adjust the values of "frame_num" to be continuous. As a result, the moving picture editing apparatus 10 generates the adjustment information for adjusting the values of "frame_num" and "POC" to be continuous.

In relation to such an adjustment method, the header analyzing unit 31 according to the first embodiment identifies a picture having a value of "0" for "POC" that has been decoded. This is because an adjustment on the picture having the decoded "POC" value of "0" to make the value of "POC" become "0" also upon re-encoding allows the values of "POC" to be adjustable to be continuous upon decoding. In the example illustrated in FIG. 3, the header analyzing unit 31 identifies a picture P14.

Next, the header analyzing unit 31 compares, with respect to a picture P15 having a number of pictures from the picture P14 of "1", the number of pictures "1" from the picture P14 with a value of "frame_num" of "0" of the picture P15 A value of "frame_num" of a picture for which its value of "POC" has been adjusted to "0" is supposed to be adjusted to "0" also. Therefore, when "frame_num" is counted up after such adjustments, only a number worth a number of pictures will be counted up at most. Accordingly, to adjust values of "frame_num" to be continuous by adjusting a number of referenced pictures, the number of pictures needs to be equal to or larger than the value of "frame_num".

In an example illustrated in FIG. 3, because the number of pictures is equal to or larger than the value of "frame_num", the header analyzing unit 31 determines in advance that the minimum range for which the values of "frame_num" and "POC" are adjustable is up to the picture P14. Subsequently, the header analyzing unit 31 determines whether there is an I picture in a range of a number of pictures "3" from the picture P14. The number of pictures "3" may be changed arbitrarily. In the example illustrated in FIG. 3, an I picture I17 exists, and thus the header analyzing unit 31 analyzes that the pictures up to a picture P16 immediately before the picture I17 are extracted. The header analyzing unit 31 notifies a result of the analysis, "P12" to "P16", and information relating to "POC" and "frame_num" obtained by decoding the headers of the pictures of around the picture P12 to around a picture P20 to the encoded-data extracting unit 32.

The encoded-data extracting unit 32 extracts the pictures of the predetermined range including the pictures subsequent to the coupling point from the encoded data yet to be edited. The encoded-data extracting unit 32 is connected to the header analyzing unit 31, the POC changing unit 33, and the frame_num changing unit 34. Upon reception of the result of the analysis from the header analyzing unit 31, the encoded-data extracting unit 32 controls reading from the pre-edit encoded-data storage unit 21 so that the pictures of the predetermined range are extracted based on the result of the analysis. Further, upon reception of the analysis result from the header analyzing unit 31, the encoded-data extracting unit 32 notifies the information relating to "POC" to the POC changing unit 33 and the information relating to "frame_num" to the frame_num changing unit 34.

For example, upon reception of the analysis result, "P12" to "P16", from the header analyzing unit 31, the encoded-data extracting unit 32 performs a control such that the elementary stream ES1 is read by the encoded-data coupling unit 37 when the elementary stream ES1 is read out from the pre-edit encoded-data storage unit 21. Further, when the elementary stream ES2 is read out from the pre-edit encoded-data storage unit 21, the encoded-data extracting unit 32 performs a control such that the pictures other than the pictures P12 to P16 are read out by the encoded-data coupling unit 37, and the pictures P12 to P16 are read out by the H.264 decoder 35.

For example, because the information relating to "POC" and the information relating to "frame_num" which are obtained by decoding the headers of the pictures P12 to P20 are also notified from the header analyzing unit 31, the encoded-data extracting unit 32 notifies the POC changing unit 33 of the information relating to "POC" of the pictures P12 to P17 with the analysis result, "P12" to "P16". The encoded-data extracting unit 32 also notifies the frame_num changing unit 34 of the information relating to "frame_num" of the pictures P12 to P17 with the analysis result, "P12" to "P16".

The POC changing unit 33 generates the adjustment information for adjusting "POC". The POC changing unit 33 is connected to the encoded-data extracting unit 32, the H.264 encoder 36, and the frame_num changing unit 34. Upon reception of the information relating to "POC" from the encoded-data extracting unit 32, the POC changing unit 33 generates the adjustment information for adjusting "POC" such that the values of "POC" becomes continuous upon decoding from/to inside to/from outside the extracted predetermined range, and notifies the generated adjustment information to the H.264 encoder 36 and the frame_num changing unit 34.

For example, upon reception of the information relating to "POC" of the pictures P12 to P17 with the analysis result, "P12" to "P16", from the encoded-data extracting unit 32, the POC changing unit 33 identifies the picture having a "POC" value of "0". This is because, when the picture having the "POC" value of "0" is adjusted so that the value of "POC" becomes "0" also upon re-encoding, the values of "POC" become adjustable to be continuous upon decoding. In the example illustrated in FIG. 4, the POC changing unit 33 identifies the picture P14.

As illustrated in FIG. 4, the POC changing unit 33 generates the adjustment information to add "mmco=5" (memory_management_control_operation=5) to the header of the specified picture P14. This "mmco=5" is a command from the encoder end that instructs resetting of a picture buffer at the decoder end. When mmco=5 is added to the header of the picture P14, the decoder end not only resets the value of "POC" of the picture P14 to "0" but also the value of "frame_num" to "0", as illustrated in FIG. 4.

The frame_num changing unit 34 generates the adjustment information for adjusting "frame_num". The frame_num changing unit 34 is connected to the encoded-data extracting unit 32, the POC changing unit 33, and the H.264 encoder 36. Upon reception of the information relating to "frame_num" from the encoded-data extracting unit 32 and the adjustment information from the POC changing unit 33, the frame_num changing unit 34 generates the adjustment information for adjusting the values of "frame_num" so that the values becomes continuous upon decoding from/to inside to/from outside the extracted predetermined range. The frame_num changing unit 34 notifies the generated adjustment information to the H.264 encoder 36.

For example, the encoded-data extracting unit 32 notifies the information relating to the values of "frame_num" of pictures P12 to P17 to the frame_num changing unit 34, together with the analysis result, "P12" to "16". Further, the POC changing unit 33 notifies the adjustment information to add mmco=5 to the header of the picture P14 to the frame_num changing unit 34. The frame_num changing unit 34 then determines that discontinuity as illustrated in FIG. 4 occurs as a result of resetting the value of "frame_num" of the picture P14 to "0", and adjusts the number of referenced pictures as illustrated in FIG. 5, to generate the adjustment information. That is, the frame_num changing unit 34 changes, for example, the picture P15 to a picture B15 to change the picture to a picture not referenced by another picture. When a picture is referenced by another picture, "frame_num" is counted up at the next picture. Therefore, when the picture B15 is changed to a non-referenced picture, "frame_num" is counted up, "0", "1", and "1", and become continuous with the subsequent picture I17 as illustrated in FIG. 5.

The H.264 decoder 35 decodes the encoded data. The H.264 decoder 35 is connected to the pre-edit encoded-data storage unit 21 and the H.264 encoder 36. The H.264 decoder 35 is controlled by the encoded-data extracting unit 32 to read out only the pictures of the predetermined range from the pre-edit encoded-data storage unit 21, decodes the read-out picture, and transmits the decoded picture to the H.264 encoder 36.

The H.264 encoder 36 re-encodes the decoded picture. The H.264 encoder 36 is connected to the POC changing unit 33, the frame_num changing unit 34, the H.264 decoder 35, and the encoded-data coupling unit 37. When the decoded picture is transmitted from the H.264 decoder 35, the H.264 encoder 36 adds the adjustment information notified from the POC changing unit 33 and the frame_num changing unit 34 to the header of the transmitted picture and re-encodes the added picture, and transmits the re-encoded picture to the encoded-data coupling unit 37.

For example, the H.264 encoder 36 receives the adjustment information to add mmco=5 to the header of the picture P14 from the POC changing unit 33. Therefore, the H.264 encoder 36 adds mmco=5 to the header of the picture P14 transmitted from the H.264 decoder 35 and encodes the added picture. Further, the H.264 encoder 36 receives adjustment information to change the picture P15 to the picture B15 to thereby change the picture to a picture not referenced by another picture from the frame_num changing unit 34. Therefore, the H.264 encoder 36 changes the picture P15 transmitted from the H.264 decoder 35 to the picture B15 to change the picture to a picture not referenced by another picture and performs encoding.

The encoded-data coupling unit 37 couples the encoded data. The encoded-data coupling unit 37 is connected to the H.264 encoder 36, the pre-edit encoded-data storage unit 21, and the post-edit encoded-data storage unit 22. The encoded-data coupling unit 37 is controlled by the encoded-data extracting unit 32 to read out only the pictures outside the predetermined range from the pre-edit encoded-data storage unit 21. The encoded-data coupling unit 37 couples the read pictures outside the predetermined range and the re-encoded pictures of the predetermined range transmitted from the H.264 encoder 36. The encoded-data coupling unit 37 stores the coupled pictures in the post-edit encoded-data storage unit 22.

For example, the encoded-data coupling unit 37 is controlled by the encoded-data extracting unit 32 to read out the elementary stream ES1 from the pre-edit encoded-data storage unit 21. Further, when the encoded-data coupling unit 37 is controlled by the encoded-data extracting unit 32 to read out the elementary stream ES2 from the pre-edit encoded-data storage unit 21, the encoded-data coupling unit 37 reads only the pictures other than the pictures P12 to P16. The encoded-data coupling unit 37 then couples the pictures read out from the pre-edit encoded-data storage unit 21 and the re-encoded pictures P12 to P16 transmitted from the H.264 encoder 36, and stores the coupled pictures in the post-edit encoded-data storage unit 22.

[Procedural Steps Performed by Moving Picture Editing Apparatus According to First Embodiment]

Figure 6:
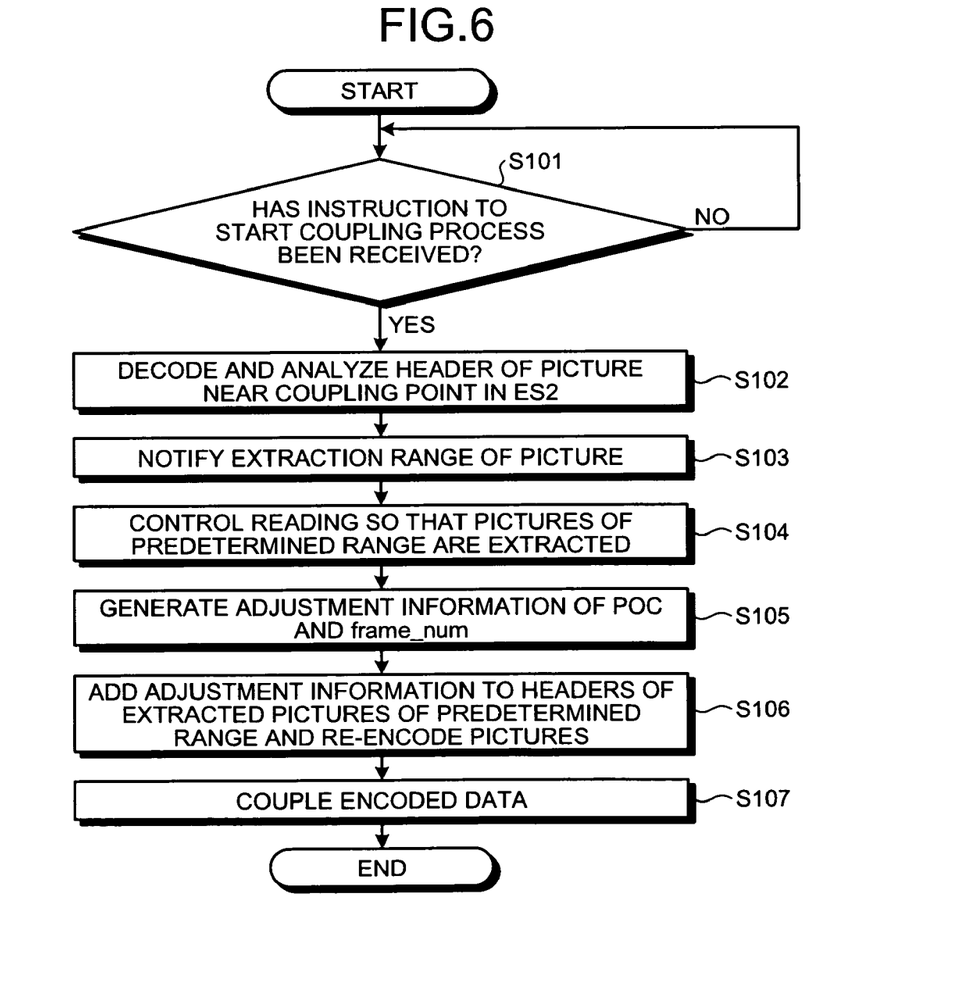
FIG. 6 is a flowchart of procedural steps performed by the moving picture editing apparatus according to the first embodiment.

Procedural steps performed by the moving picture editing apparatus according to the first embodiment is explained next with reference to FIG. 6. FIG. 6 is a flowchart of the procedural steps performed by the moving picture editing apparatus.

As illustrated in FIG. 6, the header analyzing unit 31 determines whether an instruction to start a coupling process has been received (Step S101). If the header analyzing unit 31 determines that the instruction has been received (YES at Step S101), the header analyzing unit 31 decodes and analyzes the headers of the pictures near the coupling point in the elementary stream ES2 (Step S102).

Subsequently, the header analyzing unit 31 analyzes an extraction range of the pictures and notifies the encoded-data extracting unit 32 of the extraction range (Step S103).

The encoded-data extracting unit 32 then controls reading from the pre-edit encoded-data storage unit 21 so that the pictures in the predetermined range including the subsequent pictures are extracted based on a result of the analysis notified from the header analyzing unit 31 (Step S104).

The POC changing unit 33 and the frame_num changing unit 34, having received the analysis result and the information relating to "POC" and "frame_num" from the encoded-data extracting unit 32, generates the adjustment information for adjusting the values of "POC" and "frame_num" to be continuous upon decoding from/to inside to/from outside the extracted predetermined range (Step S105).

The H.264 encoder 36 adds the adjustment information generated by the POC changing unit 33 and the frame_num changing unit 34 to the headers of the pictures which are within the extracted predetermined range and have been decoded by the H.264 decoder 35, and performs re-encoding (Step S106).

The encoded-data coupling unit 37 then couples the pictures outside the predetermined range read out from the pre-edit encoded-data storage unit 21 and the pictures of the predetermined range transmitted from the H.264 encoder 36, and stores the coupled pictures in the post-edit encoded-data storage unit 22 (Step S107). Finally, the moving picture editing apparatus 10 ends the coupling process.

[Effects of First Embodiment]

As described above, in the moving picture editing apparatus 10, the encoded-data extracting unit 32 extracts the pictures of the predetermined range including the pictures subsequent to the coupling point from the encoded data to be coupled. The POC changing unit 33 and the frame_num changing unit 34 generate the adjustment information for adjusting the information which is to become continuous values upon decoding, from among the information included in the headers of the pictures of the predetermined range, so that the information becomes continuous values upon decoding from/to inside to/from outside the predetermined range. The H.264 encoder 36 adds the adjustment information to the headers of the pictures in the predetermined range and re-encodes the pictures of the predetermined range.

Figure 7:
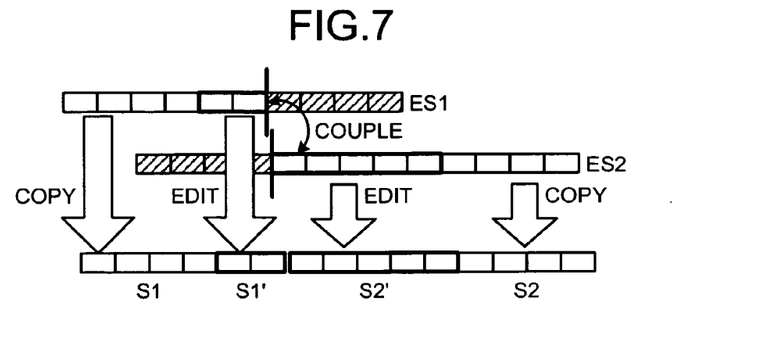
FIG. 7 is a diagram illustrating an effect of the first embodiment.

According to the moving picture editing apparatus 10, when coupling the two pieces of moving picture data, the number of pictures, whose headers need to be changed, are reduced. That is, conventionally, when coupling two pieces of moving picture data, a moving picture editing apparatus needs to change values of "frame_num" and "POC" of all the subsequent pictures so that values of "frame_num" and "POC" become continuous upon decoding. On the contrary, the moving picture editing apparatus 10, as illustrated in FIG. 7, extracts the pictures of the predetermined range, adjusts the values of "frame_num" and "POC" in the predetermined range so that the change of the values of "frame_num" and "POC" is completed within the pictures of the extracted range, and re-encodes the pictures with the adjustment information. As a result, the number of pictures, for which their values of "frame_num" and "POC" are changed, are reduced.

Further, in the moving picture editing apparatus 10, when the encoded data of the POC encoding type 0 is coupled, the encoded-data extracting unit 32 identifies a first picture subsequent to the coupling point, which has an LSB of "POC" of "0" included in a header thereof. The encoded-data extracting unit 32 also identifies a second picture, which is a picture subsequent to the identified first picture, and which has a value of "frame_num" included in its header equal to or less than the number of pictures counted from the identified first picture. Further, the encoded-data extracting unit 32 extracts pictures up to the picture after the identified second picture as the pictures of the predetermined range.

The POC changing unit 33 generates information indicating mmco=5 as the adjustment information (or information to change the picture type to an IDR picture) for the specified first picture. Further, the frame_num changing unit 34 generates the adjustment information for adjusting the number of referenced pictures such that the values of "frame_num" of the pictures subsequent to the first picture become continuous with the values of "frame_num" of the pictures that are not extracted, with respect to the pictures subsequent to the first picture.

According to the moving picture editing apparatus 10, when the encoded data of the POC encoding type 0 is coupled, the number of pictures, for which their headers need to be changed, are reduced.

(b) Second Embodiment

The POC type 0 has been considered in the first embodiment. However, the present invention is not limited to this type, and is also applicable to a POC type 2. An example of applying the POC type 2 is explained as a second embodiment of the present invention.

For the POC type 2, because "POC" is calculated based on "frame_num", information relating to "POC" is not encoded. That is, "POC" is calculated according to the following equation, based on "frame_num".

$$POC=2*(frame\_num+k*max\_frame\_num)$$

This "max_frame_num" refers to a largest value of "frame_num" determined by a number of bits of "frame_num" plus 1 (16 for 4 bits). Because "frame_num" is calculated by a modulo operation, k is a number of times returned from the largest value of "frame_num" to "0" (wraparound frequency). A value of k is reset to "0" at an IDR picture or mmco=5. Accordingly, when the values of "frame_num" are continuous, the values of "POC" become continuous too.

Accordingly, the moving picture editing apparatus 10 according to the second embodiment applying the POC type 2 generates the adjustment information for adjusting the values of "frame_num" to become continuous, but does not generate the adjustment information for adjusting the values of "POC".

Specifically, in the moving picture editing apparatus 10 according to the second embodiment, the header analyzing unit 31 analyzes the header of the encoded data yet to be edited similarly to the first embodiment. More specifically, as in the first embodiment, because a method of re-encoding a leading picture of the elementary stream ES2 as an IDR picture is used, the header analyzing unit 31 decodes and analyzes the headers of the pictures P12 to P20 in the elementary stream ES2. The header analyzing unit 31 according to the second embodiment uses a method of determining in advance the minimum range for which the values of "frame_num" are adjustable to extract pictures up to a picture immediately before an I picture so that the determined minimum range is included.

Figure 8:
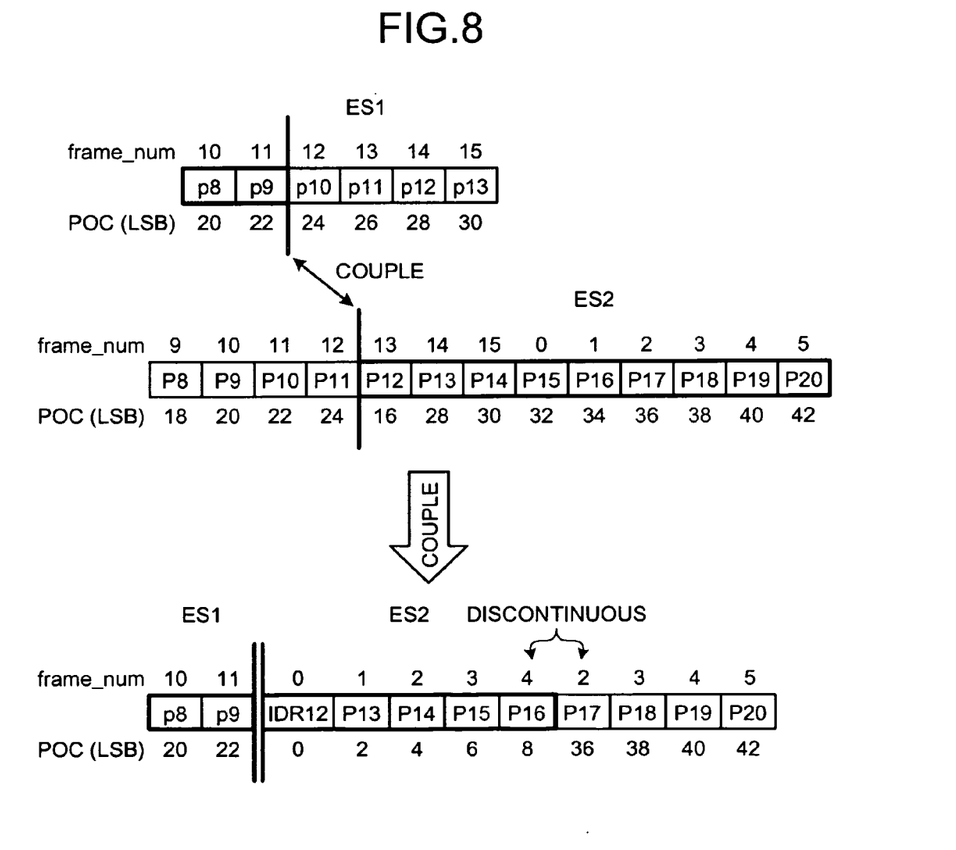
FIG. 8 is a diagram illustrating coupling of encoded data of a POC type 2.

That is, the header analyzing unit 31 according to the second embodiment identifies a picture having a decoded value of "frame_num" of "0". This is because, when the picture having the decoded value of "frame_num" of "0" is adjusted so that the value of "frame_num" becomes "0" also upon re-encoding, the values of "frame_num" and "POC" become adjustable to be continuous upon decoding. That is, when the value of "frame_num" is adjusted to "0", a wraparound (increment of k) is resolved, and thus the values of "POC" become continuous. In an example in FIG. 8, the header analyzing unit 31 identifies the picture P15.

The header analyzing unit 31 according to the second embodiment determines whether there is an I picture in a range of a number of pictures from the picture P15 being "3". This number of pictures "3" may be arbitrarily changed. In the example illustrated in FIG. 8, because there is an I picture I17, the header analyzing unit 31 analyzes that pictures up to a picture P16 immediately before the picture I17 are extracted. The header analyzing unit 31 notifies an analysis result of "P12" to "P16" and information relating to "frame_num" obtained by decoding the headers of the pictures P12 to P20 to the encoded-data extracting unit 32.

Figure 9:
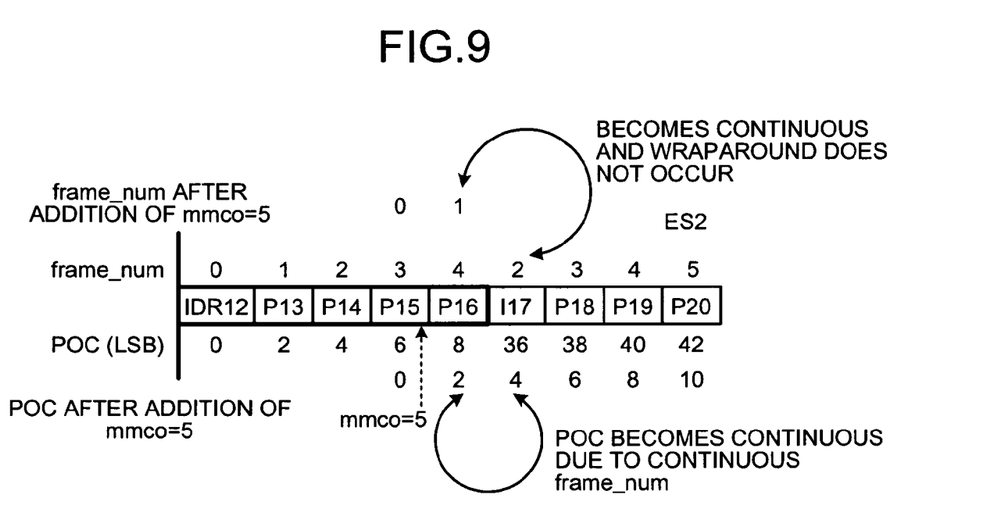
FIG. 9 is a diagram illustrating POC change and frame_num change in the second embodiment.

The frame_num changing unit 34 according to the second embodiment generates the adjustment information for adjusting "frame_num" similarly to the first embodiment. For example, the encoded-data extracting unit 32 notifies the information relating to "frame_num" of pictures P12 to P17 to the frame_num changing unit 34, together with the analysis result of "P12" to "P16". The frame_num changing unit 34 identifies a picture having a decoded value of "frame_num" of "10", and generates the adjustment information, as illustrated in FIG. 9, to add mmco=5 to the header of the identified picture P15. When mmco=5 is added to the header of the picture "P15", the decoder end not only resets "frame_num" of the picture P15 to "0" but also resets k in a calculation equation of "POC" to "0". As a result, the adjustment information for adjusting the values of "frame_num" and "POC" to be continuous is generated.

[Effects of Second Embodiment]

When the encoded-data extracting unit 32 couples the encoded data, for the POC encoding type 2, the moving picture editing apparatus 10 according to the second embodiment identifies a picture subsequent to the coupling point, which has a value of "0" for "frame_num" included in the headers thereof. Further, the encoded-data extracting unit 32 extracts pictures up to the picture following the identified picture as the pictures in the predetermined range. The frame_num changing unit 34 generates the information indicating mmco=5 as the adjustment information (or information to change the picture type to an IDR picture) for the identified picture.

Therefore, according to the moving picture editing apparatus 10 of the second embodiment, when the encoded data of the POC encoding type 2 is coupled, the number of pictures for which their headers need to be changed, are reduced.

[c] Other Embodiments as Third Embodiment

The present invention may be implemented as various different embodiments other than the above embodiments.

[Extraction of Encoded Data]

In the first embodiment, when the pictures of the predetermined range are extracted from the encoded data, they are extracted only from the elementary stream ES2. This is because, in the first embodiment, the moving picture editing apparatus 10 does not need to change the pictures of the elementary stream ES1 as the method of re-encoding the leading picture in the elementary stream ES2 as an IDR picture is used. However, the present invention is not limited to this embodiment. For example, when a method of re-encoding the leading picture of the elementary stream ES2 not as the IDR picture but as an I picture is used, it may be required to extract the pictures of the elementary stream ES1 as pictures of a predetermined range. In such a case, the moving picture editing apparatus 10 extracts pictures of a predetermined range extending over both the elementary streams ES1 and ES2 to generate adjustment information.

In the first embodiment, the method is utilized in which the moving picture editing apparatus 10 predetermines the minimum range for which values of "frame_num" and "POC" are adjustable to extract the predetermined range so that the determined minimum range is included. However, the present invention is not limited to this embodiment. For example, the moving picture editing apparatus 10 may extract a predetermined number of pictures as appropriate and generate adjustment information as required within the extracted range. It is desirable to set a sufficient number of pictures for which values of "frame_num" and "POC" are adjustable as the predetermined number of pictures. When adjustment is not possible with the predetermined number of pictures, the predetermined range may be gradually expanded.

[System Configuration]

All or a part of the processes described in the above embodiments as being performed automatically may be performed manually, or all or a part of the processes explained as being performed manually may be performed automatically by a known method. In addition, the procedural steps described above or illustrated in the drawings (for example, FIG. 6), specific names, and information including various kinds of data and parameters may be arbitrarily modified unless otherwise specified.

The elements of the apparatuses illustrated in the drawings are functional/conceptual, and need not be physically configured as illustrated in the drawings (for example, FIG. 2). In other words, the specific modes of distribution and integration of the devices are not limited to the illustrated ones, and all or a part thereof may be functionally or physically distributed or integrated in arbitrary units, according to various kinds of load and statuses of use. Furthermore, all or an arbitrary part of processing functions performed by the devices may be realized by a central processing unit (CPU) and a program analyzed and executed by the CPU, or may be realized as hardware by wired logic.

[Moving Picture Editing Program]

Figure 10:
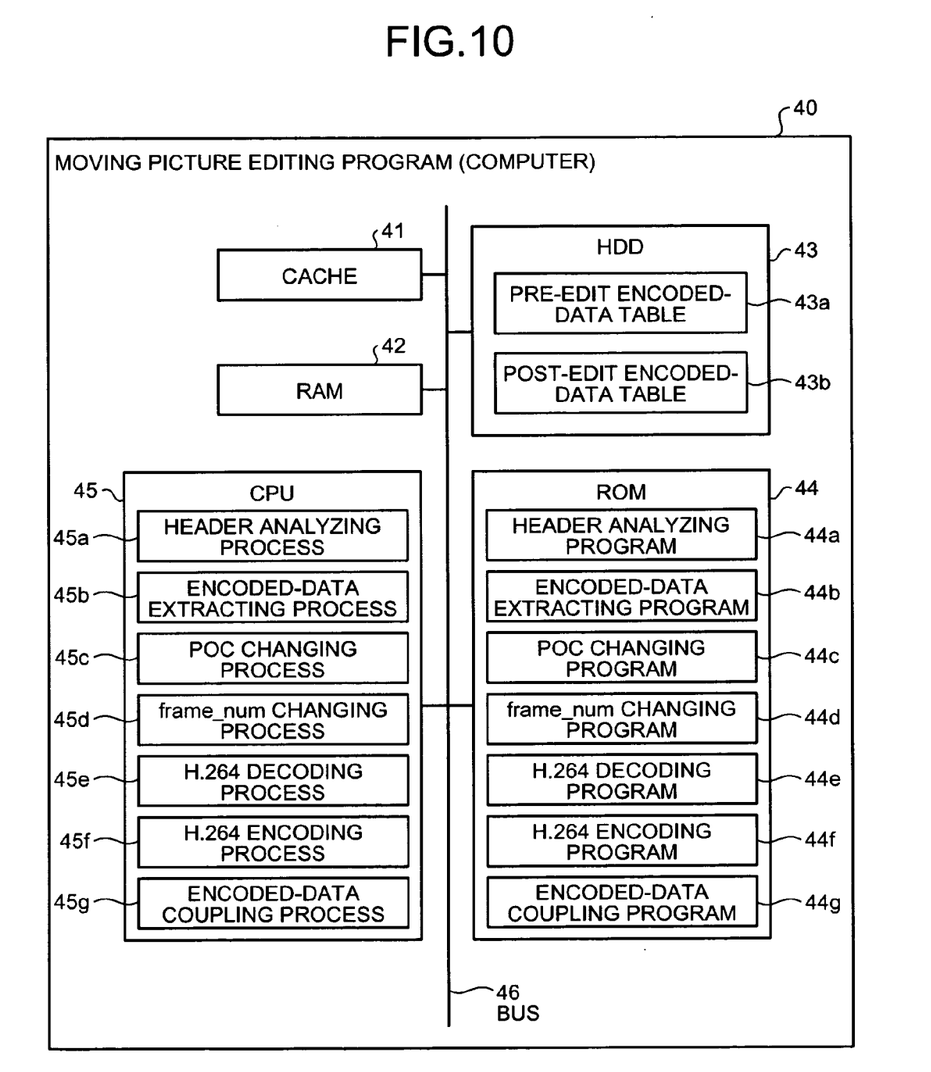
FIG. 10 is a diagram illustrating a computer that executes a moving picture editing program.

Various processes explained in the above embodiments may be realized by making a computer execute a program provided in advance. The computer may be a personal computer or a workstation. An example of a computer that executes a moving picture editing program having the same functions as those in the above embodiments is explained with reference to FIG. 10. FIG. 10 is a diagram illustrating a computer that executes a moving picture editing program.

As illustrated in FIG. 10, a moving picture editing program (computer) 40 includes a cache 41, a random access memory (RAM) 42, a hard disk drive (HDD) 43, a read only memory (ROM) 44, and a CPU 45, which are connected by a bus 46. The ROM 44 includes a moving picture editing program that demonstrates the same functions as those in the above embodiments, that is, as shown in FIG. 10, a header analyzing program 44a, an encoded-data extracting program 44b, a POC changing program 44c, a frame_num changing program 44d, an H.264 decoding program 44e, an H.264 encoding program 44f, and an encoded-data coupling program 44g.

The CPU 45 reads and executes these programs 44a to 44g, and as illustrated in FIG. 10, to carry out a header analyzing process 45a, an encoded-data extracting process 45b, a POC changing process 45c, a frame_num changing process 45d, an H.264 decoding process 45e, an H.264 encoding process 45f, and an encoded-data coupling process 45g, respectively. The processes 45a to 45g respectively correspond to the header analyzing unit 31, the encoded-data extracting unit 32, the POC changing unit 33, the frame_num changing unit 34, the H.264 decoder 35, the H.264 encoder 36, and the encoded-data coupling unit 37 illustrated in FIG. 2.

The HDD 43 includes, as illustrated in FIG. 10, a pre-edit encoded-data table 43a and a post-edit encoded-data table 43b. The pre-edit encoded-data table 43a and the post-edit encoded-data table 43b respectively correspond to the pre-edit encoded-data storage unit 21 and the post-edit encoded-data storage unit 22 illustrated in FIG. 2.

The programs 44a to 44g are not necessarily stored in the ROM 44. These programs may be stored in, for example, a "portable physical medium" such as a flexible disk (FD), a CD-ROM, a magneto-optical (MO) disk, a digital versatile disk (DVD), an optical magnetic disk, or an integrated circuit (IC) card inserted in the computer 40, a "fixed physical medium" such as a hard disk drive (HDD) provided inside or outside the computer 40, or "another computer (or a server)"

connected to the computer 40 via a public line, the Internet, a local area network (LAN), or a wide area network (WAN). The computer 40 may thus read the programs from any of the above to execute them.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A moving picture editing apparatus comprising:
a picture extracting unit that extracts pictures of a predetermined range including a picture subsequent to a coupling point from encoded data to be coupled;
an adjustment-information generating unit that generates adjustment information for adjusting values of a counter that counts up referenced pictures to be continuous from/to inside to/from outside the predetermined range after decoding, from among information included in headers of the pictures of the predetermined range extracted by the picture extracting unit; and
a re-encoding unit that adds the adjustment information generated by the adjustment-information generating unit to the headers of the pictures of the predetermined range extracted by the picture extracting unit, and re-encodes the pictures of the predetermined range, wherein
the encoded data to be coupled is of an encoding type 0 of picture order count (POC) indicating a display order, the picture extracting unit identifies a first picture subsequent to the coupling point having a least significant bit (LSB) of POC of 0 included in a header thereof, identifies a second picture subsequent to the identified first picture, having a value of the counter included in a header thereof equal to or less than a number of pictures from the specified first picture, and extracts pictures UP to a picture following the identified second picture as the pictures of the predetermined range, and
the adjustment-information generating unit generates information indicating mmco=5 or information for changing a picture type to an IDR picture as the adjustment information for the identified first picture, and generates information for adjusting a number of referenced pictures to be continuous with a value of the counter of a picture that has not been extracted by the picture extracting unit as the adjustment information, for a picture subsequent to the identified first picture.

2. A moving picture editing apparatus comprising:
a picture extracting unit that extracts pictures of a predetermined range including a picture subsequent to a coupling point from encoded data to be coupled;
an adjustment-information generating unit that generates adjustment information for adjusting values of a counter that counts UP referenced pictures to be continuous from/to inside to/from outside the predetermined range after decoding, from among information included in headers of the pictures of the predetermined range extracted by the picture extracting unit; and
a re-encoding unit that adds the adjustment information generated by the adjustment-information generating unit to the headers of the pictures of the predetermined range extracted by the picture extracting unit, and re-encodes the pictures of the predetermined range, wherein
the encoded data to be coupled is of an encoding type 2 of POC, the picture extracting unit identifies a picture subsequent to the coupling point having a value of the counter of 0 included in a header thereof, and extracts pictures up to a picture following the identified picture as pictures of the predetermined range, and
the adjustment-information generating unit generates information indicating mmco=5 or information for changing a picture type to an IDR picture as the adjustment information for the picture identified by the picture extracting unit.

3. A non-transitory computer readable storage medium containing instructions that, when executed by a computer, cause the computer to perform:
extracting pictures of a predetermined range including a picture subsequent to a coupling point from a storage unit that stores encoded data to be coupled;
generating adjustment information for adjusting values of counter that counts up referenced pictures to be continuous from/to inside to/from outside the predetermined range after decoding, from among information included in headers of the pictures of the predetermined range extracted; and
adding the adjustment information generated to the headers of the pictures of the predetermined range extracted, and re-encoding the pictures of the predetermined range, wherein
the encoded data to be coupled is of an encoding type 0 of picture order count (POC) indicating a display order, the extracting includes identifying a first picture subsequent to the coupling point having a least significant bit (LSB) of POC of 0 included in a header thereof, identifying a second picture subsequent to the identified first picture, having a value of the counter included in a header thereof equal to or less than a number of pictures from the specified first picture, and extracting pictures UP to a picture following the identified second picture as the pictures of the predetermined range, and
the generating includes generating information indicating mmco=5 or information for changing a picture type to an IDR picture as the adjustment information for the identified first picture, and generating information for adjusting a number of referenced pictures to be continuous with a value of the counter of a picture that has not been extracted by the extracting as the adjustment information, for a picture subsequent to the identified first picture.

4. A non-transitory computer readable storage medium containing instructions that, when executed by a computer, cause the computer to perform:
extracting pictures of a predetermined range including a picture subsequent to a coupling point from a storage unit that stores encoded data to be coupled;
generating adjustment information for adjusting values of a counter that counts up referenced pictures to be continuous from/to inside to/from outside the predetermined range after decoding, from among information included in headers of the pictures of the predetermined range extracted; and
adding the adjustment information generated to the headers of the pictures of the predetermined range extracted, and re-encoding the pictures of the predetermined range, wherein the encoded data to be coupled is of an encoding type 2 of POC, the extracting includes identifying a picture subsequent to the coupling point having a value of the counter of 0 included in a header thereof, and extracting pictures UP to a picture following the identified picture as pictures of the predetermined range, and the generating includes generating information indicating mmco=5 or information for changing a picture type to an IDR picture as the adjustment information for the picture identified by the extracting.

\* \* \* \* \*